(12) United States Patent
Akaike et al.

(10) Patent No.: US 10,144,325 B2
(45) Date of Patent: Dec. 4, 2018

(54) VEHICLE SEAT

(71) Applicant: TOYOTA BOSHOKU KABUSHIKI KAISHA, Aichi-ken (JP)

(72) Inventors: Fumitoshi Akaike, Aichi-ken (JP); Yasuhiro Kato, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/498,849

(22) Filed: Apr. 27, 2017

(65) Prior Publication Data

US 2017/0313226 A1   Nov. 2, 2017

(30) Foreign Application Priority Data

Apr. 28, 2016   (JP) ................. 2016-090903

(51) Int. Cl.
| | |
|---|---|
| *B60N 2/68* | (2006.01) |
| *B60R 22/34* | (2006.01) |
| *B60R 22/26* | (2006.01) |

(52) U.S. Cl.
CPC ............. *B60N 2/682* (2013.01); *B60N 2/688* (2013.01); *B60R 22/26* (2013.01); *B60R 22/34* (2013.01); *B60R 2022/3402* (2013.01)

(58) Field of Classification Search
CPC .......... B60N 2/688; B60R 22/26; B60R 22/34
USPC ............... 297/452.2, 216.13, 483, 452.18
See application file for complete search history.

(56) References Cited

U.S. PATENT DOCUMENTS

| | | | | |
|---|---|---|---|---|
| 5,452,941 A | * | 9/1995 | Halse ..................... | B60N 2/688 297/452.2 |
| 5,575,533 A | * | 11/1996 | Glance ................... | B60N 2/682 297/232 |
| 5,609,396 A | * | 3/1997 | Loxton ................... | B60N 2/688 297/464 |
| 5,611,604 A | * | 3/1997 | Thomas .................. | B60R 22/26 280/808 |
| 5,645,316 A | * | 7/1997 | Aufrere ................. | B60N 2/2222 297/216.13 |
| 5,697,670 A | * | 12/1997 | Husted ................. | B60N 2/4221 297/216.13 |
| 5,829,831 A | * | 11/1998 | Sharman .................. | B60N 2/36 297/378.12 |
| 6,045,186 A | * | 4/2000 | Butt ...................... | B60N 2/4221 297/216.1 |
| 6,123,388 A | * | 9/2000 | Vits ........................ | B60N 2/688 297/216.13 |

(Continued)

FOREIGN PATENT DOCUMENTS

JP        9-254689        9/1997

*Primary Examiner* — Syed A Islam
(74) *Attorney, Agent, or Firm* — Greenblum & Bernstein, P.L.C.

(57) ABSTRACT

A vehicle seat includes: a first frame member that forms a framework of the vehicle seat and extends in a seat vertical direction or in a seat front-and-rear direction; a second frame member that extends in a seat width direction; and a component mounting bracket that allows to mount a component and is provided in an inside-seat corner portion of a connecting part of the first frame member and the second frame member, wherein the first frame member or the second frame member has a hole into which a portion of the component is inserted when the component is mounted in the component mounting bracket.

9 Claims, 8 Drawing Sheets

(56) References Cited

U.S. PATENT DOCUMENTS

| | | | | |
|---|---|---|---|---|
| 6,382,717 B1* | 5/2002 | Yasui | B60N 2/4228 | 297/216.13 |
| 6,585,325 B1* | 7/2003 | Pal | B60R 22/26 | 297/452.2 |
| 6,601,923 B2* | 8/2003 | Pond | B60N 2/24 | 297/484 |
| 6,767,055 B1* | 7/2004 | Sparks | B60N 2/162 | 297/216.13 |
| 8,061,779 B2* | 11/2011 | Nakagaki | B60N 2/686 | 297/440.2 |
| 8,132,862 B2* | 3/2012 | Yamada | B60N 2/688 | 297/216.13 |
| 8,267,479 B2* | 9/2012 | Yamada | B60N 2/22 | 297/452.18 |
| 8,523,284 B2* | 9/2013 | Yamada | B60N 2/22 | 297/216.13 |
| 8,628,144 B2* | 1/2014 | Moegling | B60R 22/22 | 297/313 |
| 8,820,790 B2* | 9/2014 | Wenz | B60N 2/58 | 280/801.1 |
| 8,888,191 B2* | 11/2014 | Hosokawa | B60N 2/22 | 297/452.18 |
| 8,919,888 B2* | 12/2014 | Maruo | B60R 22/26 | 280/807 |
| 8,931,850 B2* | 1/2015 | Mitsuhashi | B60N 2/68 | 297/452.18 |
| 9,039,094 B2* | 5/2015 | Yamada | B60N 2/682 | 297/452.18 |
| 2010/0187887 A1* | 7/2010 | Yamada | B60N 2/22 | 297/354.12 |
| 2012/0248846 A1* | 10/2012 | Titz | B60R 22/20 | 297/473 |
| 2012/0319449 A1* | 12/2012 | Schenten | B60N 2/2245 | 297/452.18 |
| 2013/0187430 A1* | 7/2013 | Watanabe | B60N 2/68 | 297/452.19 |
| 2014/0232161 A1* | 8/2014 | Mitsuhashi | B60N 2/68 | 297/452.18 |
| 2014/0232162 A1* | 8/2014 | Mitsuhashi | B60N 2/68 | 297/452.18 |
| 2014/0312677 A1* | 10/2014 | Bostrom | B60N 2/68 | 297/464 |
| 2015/0352982 A1* | 12/2015 | Watanabe | B60N 2/68 | 297/354.12 |
| 2016/0347225 A1* | 12/2016 | Hayashi | B60N 2/688 | |
| 2017/0021795 A1* | 1/2017 | Gallagher | B60N 2/24 | |

* cited by examiner

VEHICLE SEAT

CROSS-REFERENCE TO RELATED APPLICATION

This application claims priorities from Japanese Patent Application No. 2016-090903 filed on Apr. 28, 2016, the entire subject matters of which is incorporated herein by reference.

TECHNICAL FIELD

The present disclosure relates to a vehicle seat.

BACKGROUND

A component such as a retractor of a seat belt device may be mounted in an upper portion of a seat back frame of a vehicle seat. In a configuration described in JP-A-H9(1997)-254689, in a wide seat back, a bracing reinforcement panel is connected with the panel-shaped seat back frame, and the retractor is mounted in the upper portion of the bracing reinforcement panel. The bracing reinforcement panel can be provided in any position of the upper side of the seat back frame in a width direction. Thus, the increase in the thickness of the seat back can be suppressed while seating comfortableness is not deteriorated when the retractor is provided in a position where a seating pressure of a seated occupant is not applied.

On the other hand, in the vehicle seat including the above-described wide seat back, three vertical frames which extend vertically may be provided. In such a type of seat, a bracket may be provided in an inner corner portion of a connecting part between any vertical frame and an upper frame extending in a lateral direction, and the retractor may be mounted therein. In such a case, it is preferable that the retractor is provided as far from a seating surface as possible, so that the seating comfortableness is not deteriorated while the increase in the thickness of the seat back is suppressed.

SUMMARY

The present disclosure is made in consideration of the above-mentioned circumstances, and one of objects of the present disclosure is to provide a vehicle seat in which a component mounting bracket is disposed in an inside-seat corner portion of a frame which forms a framework of the vehicle seat and a component is mounted therein so that seating comfortableness is not deteriorated while an increase in a thickness of a seat is suppressed.

According to an illustrative embodiment of the present disclosure, there is provided a vehicle seat including: a first frame member that forms a framework of the vehicle seat and extends in a seat vertical direction or in a seat front-and-rear direction; a second frame member that extends in a seat width direction; and a component mounting bracket that allows to mount a component and is provided in an inside-seat corner portion of a connecting part of the first frame member and the second frame member, wherein the first frame member or the second frame member has a hole into which a portion of the component is inserted when the component is mounted in the component mounting bracket.

According to another illustrative embodiment of the present disclosure, there is provided a vehicle seat including: a first frame member that forms a framework of the vehicle seat and extends in a seat vertical direction or in a seat front-and-rear direction; a second frame member that extends in a seat width direction; a component mounting bracket that is provided in an inside-seat corner portion of a connecting part of the first frame member and the second frame member; and a component that is mounted to the component mounting bracket, wherein the first frame member or the second frame member has a hole into which a portion of the component is inserted when the component is mounted in the component mounting bracket.

DETAILED DESCRIPTION

FIGS. 1 to 8 illustrate an example in which the present invention is applied to an automobile rear seat (hereinafter, simply referred to as a rear seat) according to a first embodiment of the present disclosure. Arrows in each drawing indicate directions of an automobile when a seat back frame of the rear seat is mounted in an automobile. In the following explanation, a description relating to a direction will be given on the basis of the directions.

A rear seat 1 having the seat back frame of this embodiment is a 6-side portion in the rear seat divided at 6:4 proportion, and includes a seat cushion 10 as a seating part, and a seat back 20. The rear seat 1 has a left seat LS and a central seat CS. The rear seat 1 corresponds to a "vehicle seat" in the present disclosure.

Figure 1:
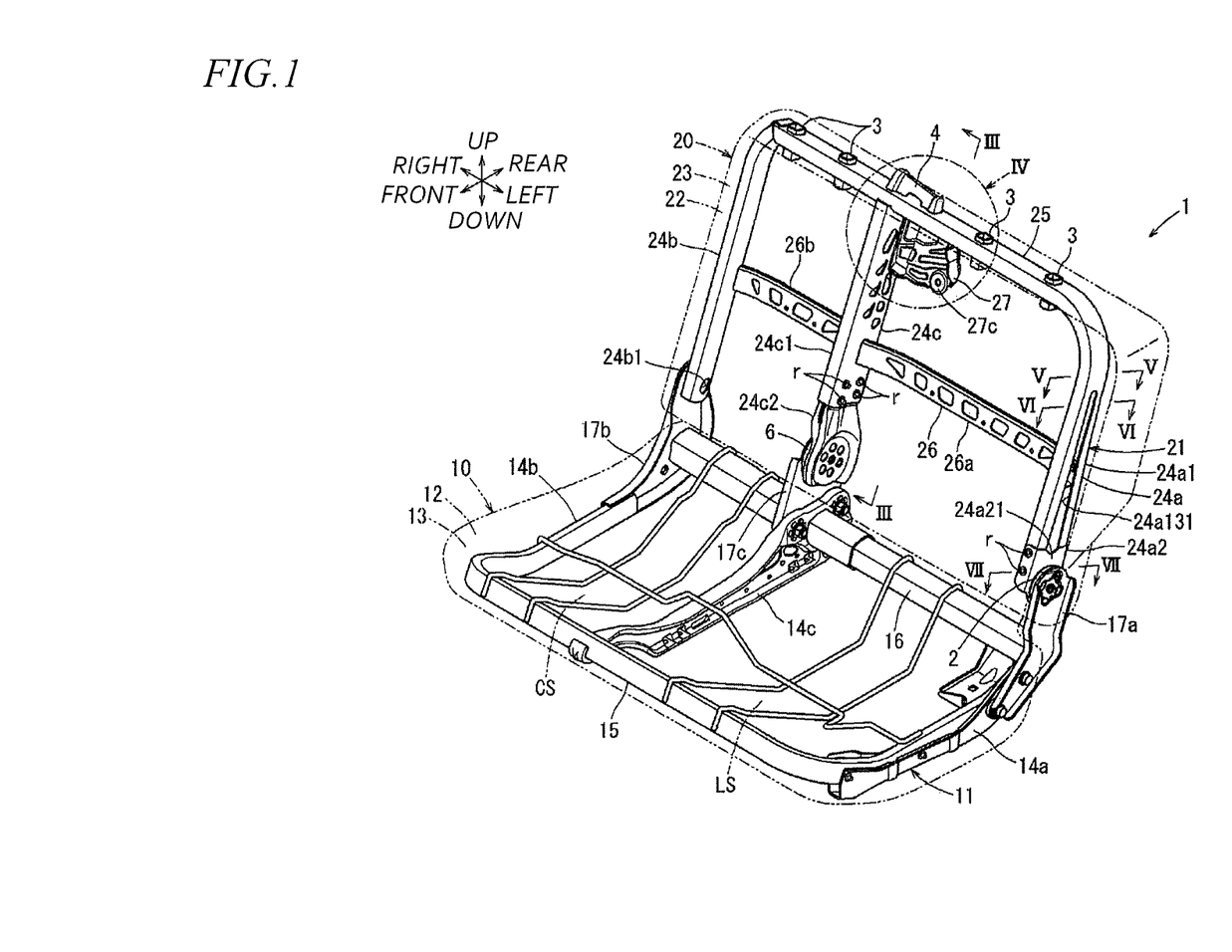
FIG. 1 is a perspective view illustrating a configuration of a seat frame according to a first embodiment of the present disclosure.

As illustrated in FIG. 1, the seat cushion 10 includes a cushion frame 11 forming a framework, a cushion pad 12 as a cushion material, and a cushion cover 13 as a skin material. The seat back 20 includes a back frame 21 forming a framework, a back pad 22 as a cushion material, and a back cover 23 as a skin material. The back frame 21 corresponds to "a seat back frame" in the present disclosure.

As illustrated in FIG. 1, the cushion frame 11 has a left side-frame 14a, a right side-frame 14b, and a central side-frame 14c which extend in a front and rear direction, a front frame 15, and a rear frame 16. Each of the front end portions of the left side-frame 14a, the right side-frame 14b, and the central side-frame 14c is connected with the front frame 15, and each of the rear end portions thereof is connected with the rear frame 16, so as to make an almost rectangular shape in top view.

The left side-frame 14a is disposed on a door side which is the outside of the automobile, and the cushion frame 11 is mounted in the floor of the automobile through the bracket (not illustrated). A left lower-arm 17a for mounting the back frame 21 is connected in the vicinity of the rear end portion of the left side-frame 14a. A right lower-arm 17b for mounting the back frame 21 is connected in the vicinity of the rear end portion of the right side-frame 14b. The central lower-arm 17c for mounting the back frame 21 is connected in the vicinity of the rear end portion of the central side-frame 14c.

The strength of the side frames and the lower arms is adjusted in correspondence to a magnitude of bending stress applied from the back frame 21. That is, the bending strength is designed such that the bending strength of the central side-frame 14c and the central lower-arm 17c, the bending strength of the left side-frame 14a and the left lower-arm 17a, and the bending strength of the right side-frame 14b and the right lower-arm 17b are large in order.

As illustrated in FIGS. 1 to 8, the back frame 21 has a left side-frame 24a, a right side-frame 24b, and a central side-frame 24c which extend vertically, an upper frame 25, and a center frame 26.

The left side-frame 24a and the upper frame 25 are formed integrally. The upper end portion of the left side-frame 24a is bent in a right direction to form the upper frame 25. The left side-frame 24a has a main body part 24a1, which is formed by processing a work material obtained by extrusion-molding a metal material (aluminum in this embodiment), and a lower bracket 24a2 which is fastened in the lower end portion of the main body part 24a1 by a rivet r and is connected with a recliner 2.

Figure 5:
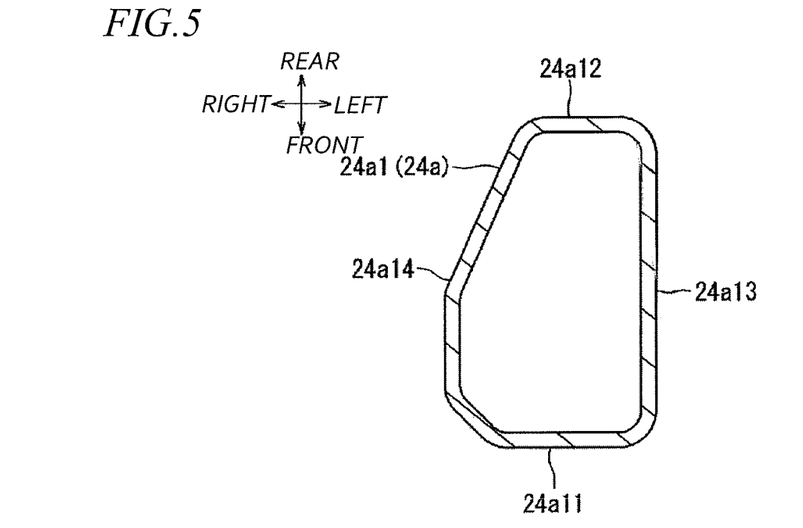
FIG. 5 is a sectional view taken along line V-V shown in FIG. 1.
Figure 6:
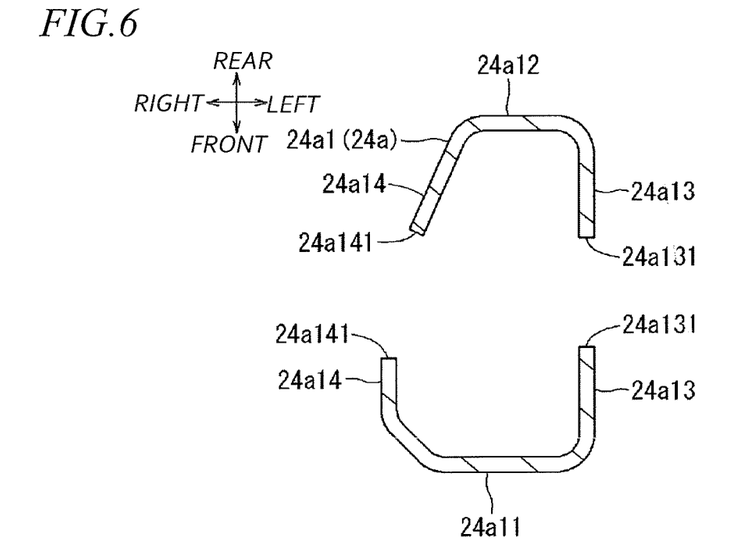
FIG. 6 is a sectional view taken along line VI-VI shown in FIG. 1.

As illustrated in FIG. 5, a lateral section from the upper portion of the left side-frame 24a to the upper frame 25 is a certain closed section, and has an almost rectangular shape. Specifically, the lateral section has a front surface 24a11 and a rear surface 24a12 which extend in parallel in a lateral direction. In addition, the lateral section has a left surface 24a13 which connects the left end of the front surface 24a11 and the left end of the rear surface 24a12, and a right surface 24a14 which connects the right end of the front surface 24a11 and the right end of the rear surface 24a12.

The front surface 24a11 has a lateral length slightly longer than that of the rear surface 24a12. The front surface 24a11 and the rear surface 24a12 are crossed to be perpendicular to the left surface 24a13. The right surface 24a14 has a sectional shape which is a substantially crest shape convex to the right side. The corner of the inside and outside of the closed section is made in R-shape. Herein, the central side-frame 24c and the upper frame 25 correspond to "a first frame member" and "a second frame member", respectively, in the present disclosure.

As illustrated in FIGS. 1 to 7, the upper frame 25 is formed by bending the upper end of the main body part 24a1 of the left side-frame 24a in the right direction. Accordingly, the front surface 24a11, the rear surface 24a12, the left surface 24a13, and the right surface 24a14 of the main body part 24a1 correspond to a front surface 25a, a rear surface 25b, an upper surface 25c, and a lower surface 25d of the upper frame 25, respectively.

In the upper surface 25c and the lower surface 25d of the upper frame 25, two through holes are provided in predetermined positions of a portion corresponding to the left seat LS, and two through holes are provided in predetermined positions of a portion corresponding to the central seat CS. Rectangular cylindrical holders 3 which support a headrest support are provided therein.

A guide member 4 guiding a seat belt 5 is mounted in the upper surface 25c of the upper frame 25 corresponding to the left side of the connecting part of the central side-frame 24c. In an area from the ending portion of the upper end R of the main body part 24a1 of the left side-frame 24a to the lower end portion, a left opening 24a131 is formed in the vicinity of the center of the left surface 24a13 in the front and rear direction, and a right opening 24a141 is formed in the vicinity of the center of the right surface 24a14 in the front and rear direction. The opening end shapes of the left opening 24a131 and the right opening 24a141 match with each other when viewed from the left side.

The left opening 24a131 and the right opening 24a141 are formed such that an opening width becomes gradually larger from the upper side to the lower side. Two rivet holes 24a111 for fastening the lower bracket 24a2 by the rivet r are provided side by side vertically in the lower end portion of the front surface 24a11. Two rivet holes 24a121 for fastening the lower bracket 24a2 by the rivet r are provided side by side vertically in the lower end portion of the rear surface 24a12.

Figure 2:
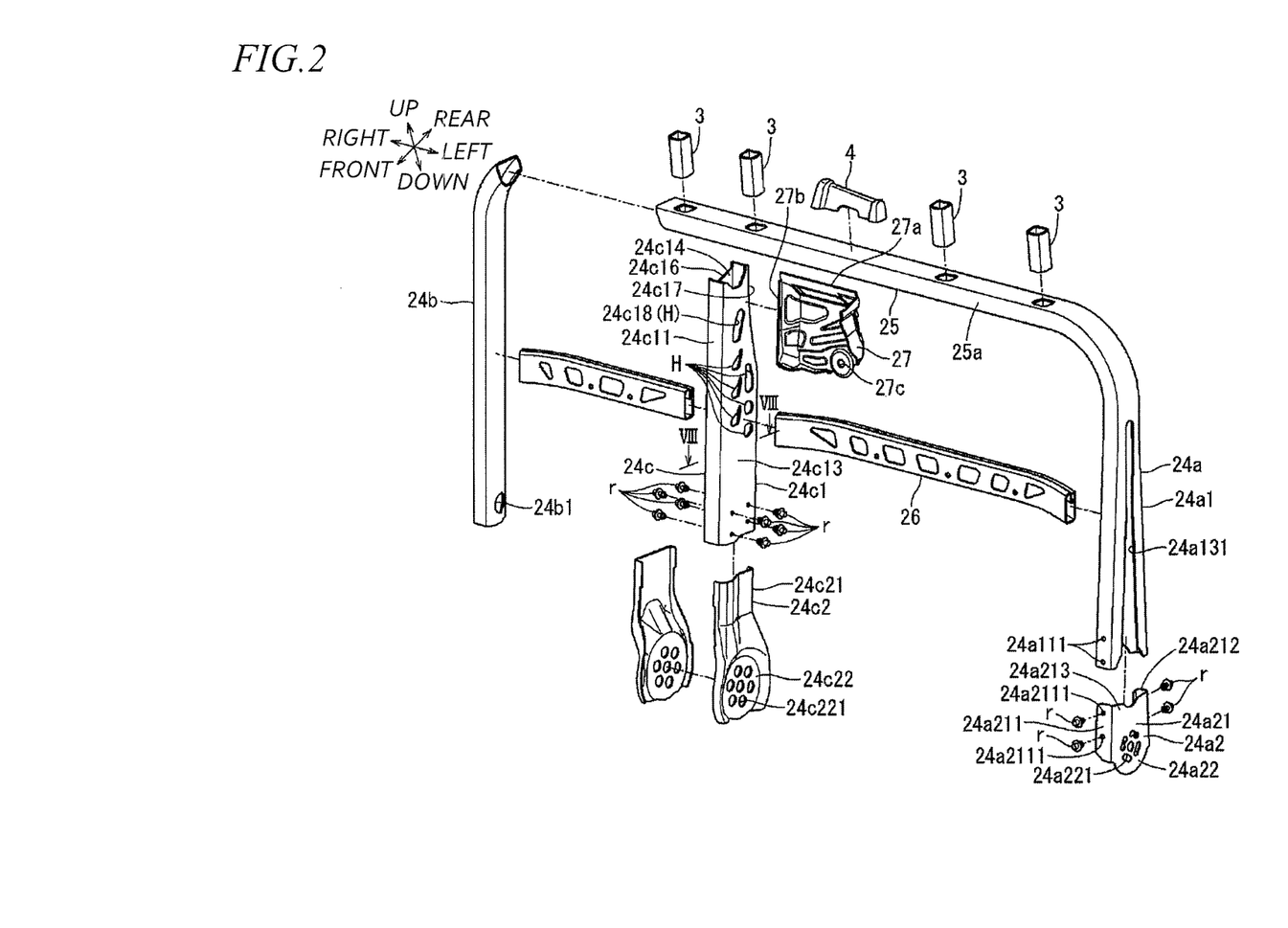
FIG. 2 is an exploded perspective view illustrating a seat back frame of the first embodiment.
Figure 7:
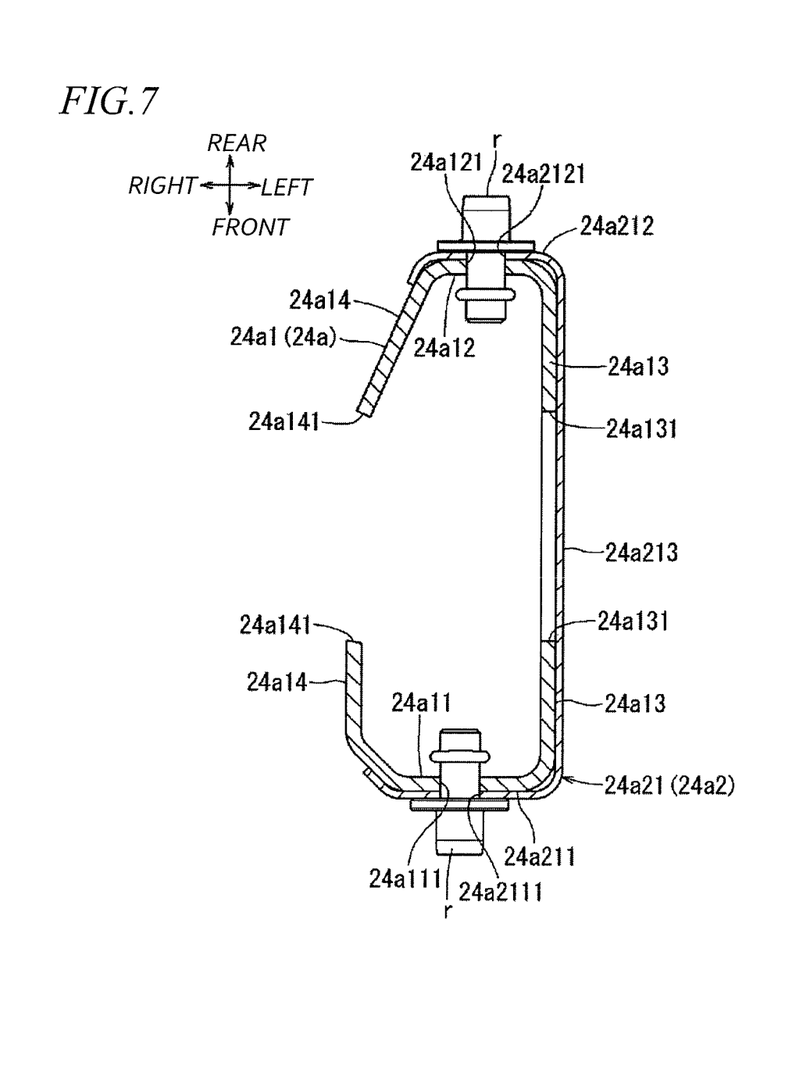
FIG. 7 is a sectional view taken along line VII-VII shown in FIG. 1.

As illustrated in FIGS. 1, 2, and 7, the lower bracket 24a2 is an iron press part, the upper portion thereof is formed as a main body connecting part 24a21 formed in a substantially U shape in which a horizontal section is open in a seat inside direction, and the lower portion thereof is formed as a flat plate-shaped recliner connecting part 24a22. The main body connecting part 24a21 has a front surface 24a211, a rear surface 24a212, and a left surface 24a213 which connects the front surface 24a211 and the rear surface 24a212.

In the front surface 24a211, two rivet holes 24a2111 for connection with the main body part 24a1 are vertically provided side by side in correspondence to the rivet hole 24a111 of the main body part 24a1. In the rear surface 24a212, two rivet holes 24a2121 for connection with the main body part 24a1 are vertically provided side by side in correspondence to the rivet hole 24a121 of the main body part 24a1.

The rivet holes 24a2111 and 24a2121 of the lower bracket 24a2 are allowed to match with the rivet holes 24a111 and 24a121 of the main body part 24a1, respectively, and the main body part 24a1 is disposed to be covered with the lower bracket 24a2. The main body part 24a1 and the lower bracket 24a2 are fastened by the rivet r. A recliner connecting hole 24a221 for connecting the recliner 2 is provided in the center of the recliner connecting part 24a22.

As illustrated in FIGS. 1 to 4, the central side-frame 24c has a central main body part 24c1 formed in such a manner that a work material with a rectangular closed section obtained by extrusion-molding a metal material (aluminum in this embodiment) is subject to a process such as cutting and drilling. The central side-frame 24c has a central lower bracket 24c2 which is connected with the lower end portion of the central main body part 24c1 by the rivet r and is connected with the recliner 6.

Figure 8:
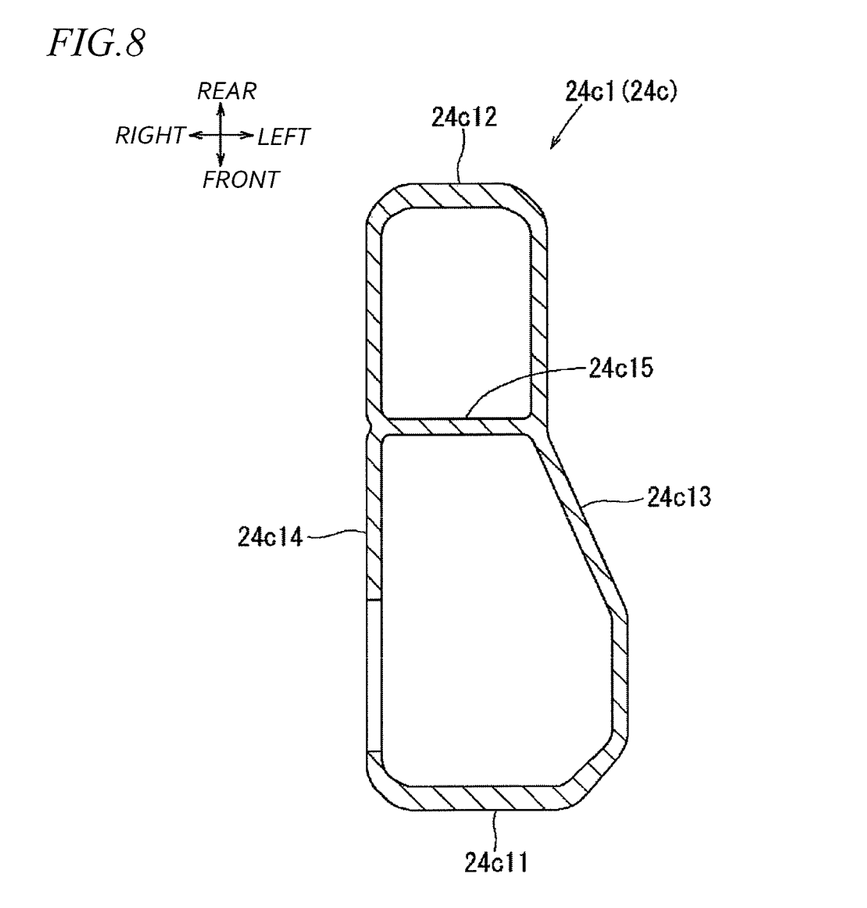
FIG. 8 is a sectional view taken along line VIII-VIII shown in FIG. 2.

As illustrated in FIG. 8, the central main body part 24c1 has a front surface 24c11, a rear surface 24c12, a left surface 24c13, a right surface 24c14, and a central surface 24c15 in the lateral section.

The front surface 24c11, the rear surface 24c12, and the central surface 24c15 extend in parallel in the lateral direction. The rear surface 24c12 and the central surface 24c15 are formed to have the same length in the lateral direction, and the front surface 24c11 is formed to be slightly longer than the rear surface 24c12 and the central surface 24c15.

The left surface 24c13 extends between the rear surface 24c12 and the central surface 24c15 in a front and rear direction in parallel with the right surface 24c14, and has a sectional shape which is a substantially crest shape convex to the left side between the central surface 24c15 and the front surface 24c11.

A notch 24c16 corresponding to the lower surface 25d of the upper frame 25 is provided in the upper end of the central main body part 24c1. A notch 24c17 corresponding to a shape of a front surface of a retractor bracket 27 is provided on the rear side of the upper end of the central main body part 24c1.

Seven irregular holes H are provided in each of the left surface 24c13 and the right surface 24c14. Among them, a hole 24c18 of the uppermost portion of the left surface 24c13 is formed in a substantially oval shape in which a long axis is tilted slightly rearward with respect to an extending direction of the central main body part 24c1. Such a hole has a function as a reduction hole.

In a state where a portion of a retractor 7 (to be described later) is inserted into the hole 24c18, the retractor 7 is mounted in the retractor bracket 27. Herein, the retractor bracket 27 corresponds to "a component mounting bracket" in appended claims.

Figure 3:
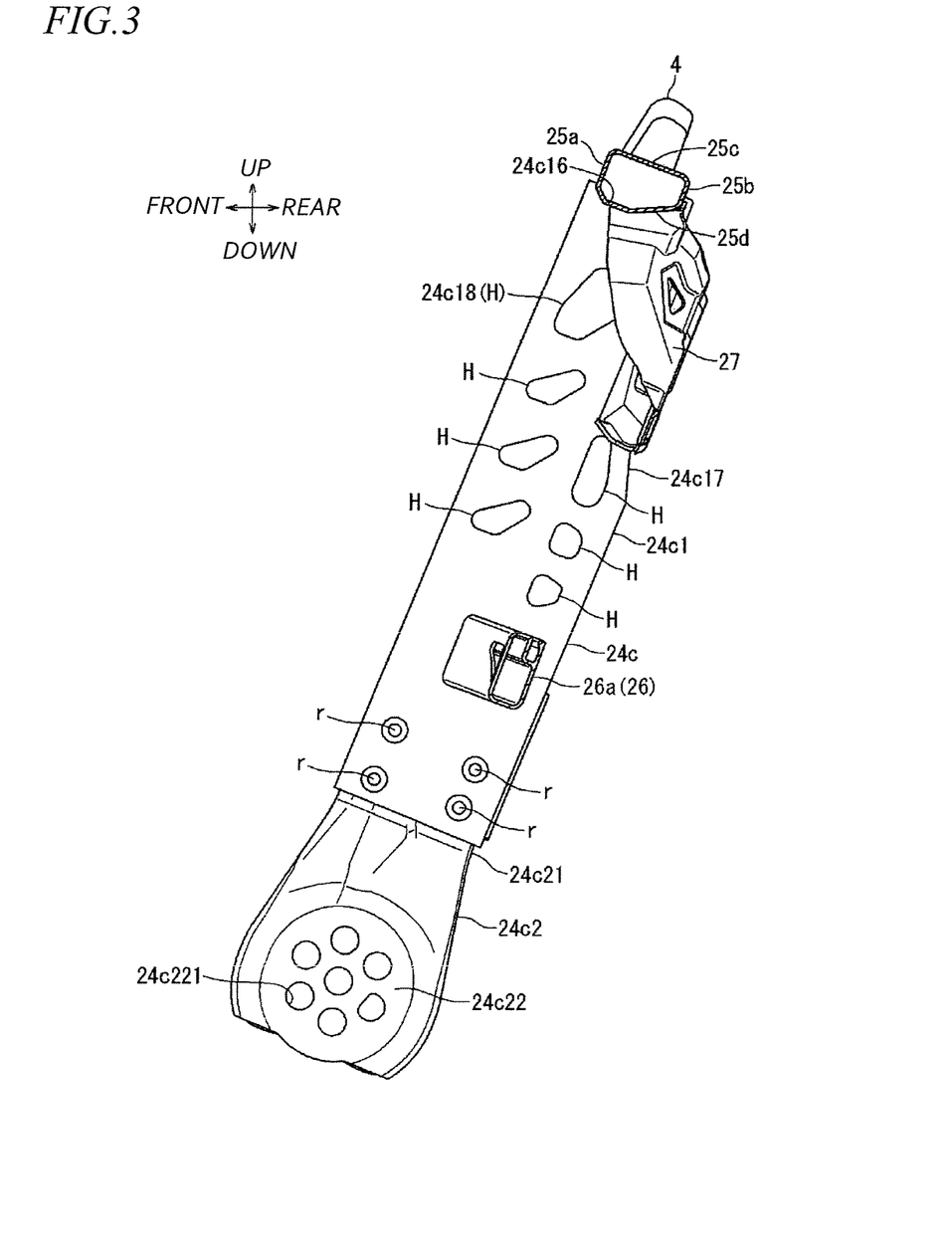
FIG. 3 a sectional view taken along line III-III shown in FIG. 1.
Figure 4:
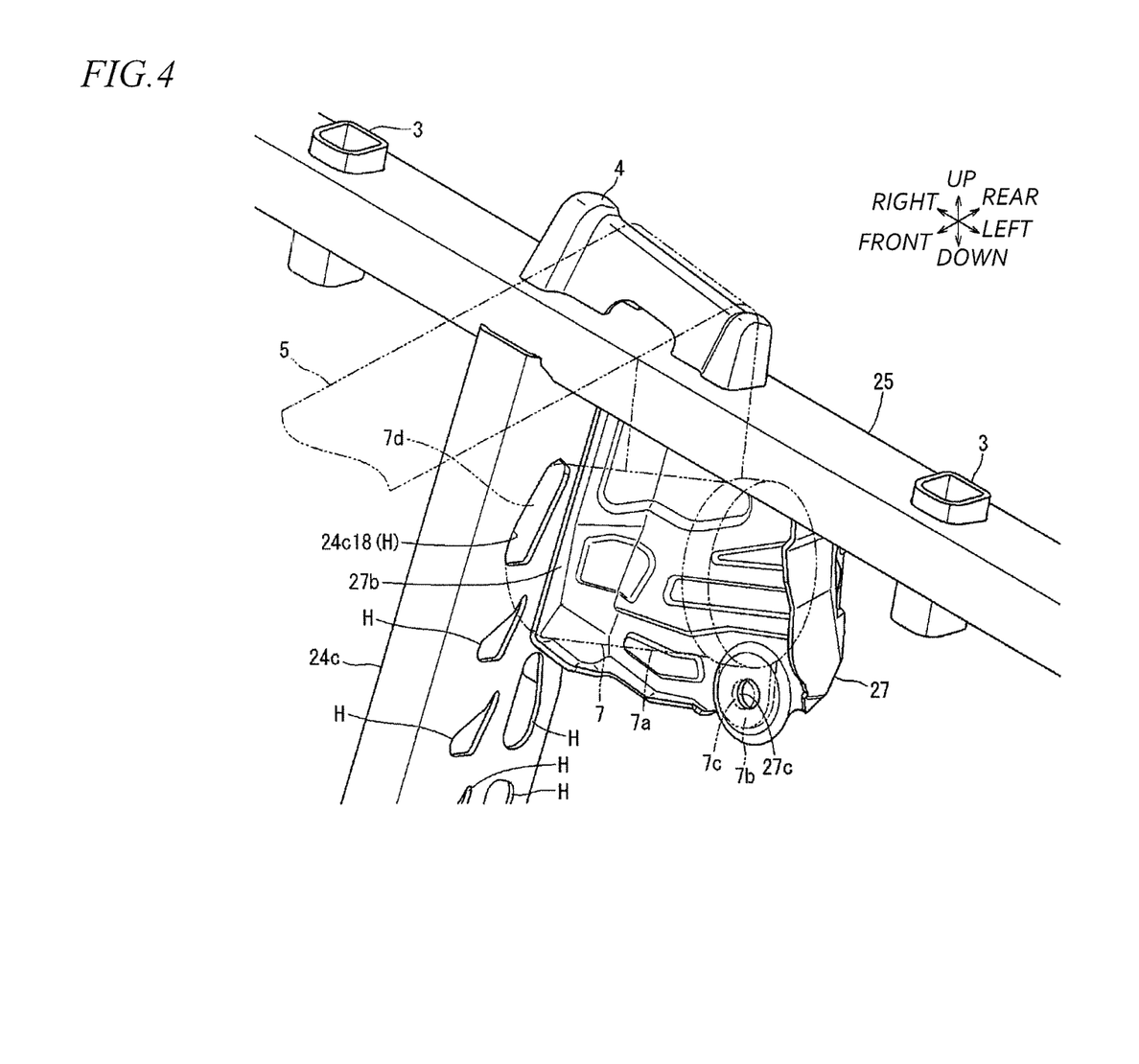
FIG. 4 is an enlarged view illustrating an area identified by an arrow IV shown FIG. 1.

As illustrated in FIGS. 1 to 3, the central lower bracket 24c2 is an iron press part, and two components are combined in a hollow shape to be formed as one component. The upper portion thereof is formed as a main body connecting part 24c21 in which the horizontal section is formed to have an almost rectangular closed section, and the lower portion thereof is formed as a flat plate-shaped recliner connecting part 24c22.

Four rivet holes (not illustrated) are provided in the main body connecting part 24c21, and the main body connecting part 24c21 is connected by the rivet r in the state of being inserted into the lower end portion of the central main body part 24c1. The recliner connecting hole 24c221 for connecting the recliner 6 is provided in the center of the recliner connecting part 24c22.

As illustrated in FIGS. 1 and 2, the right side-frame 24b is a member formed in such a manner that a work material with a closed section obtained by extrusion-molding a metal material (aluminum in this embodiment) is subject to a process such as drilling. The lateral sectional shape of the right side-frame 24b is a closed sectional shape which is the same as the section of the upper frame 25 and the section on the upper end side of the main body part 24a1 of the left side-frame 24a.

The upper end of the right side-frame 24b is bent to left side to abut on the right end of the upper frame 25, and is connected by welding. That is, the upper end of the main body part 24a1 of the left side-frame 24a and the right side-frame 24b are connected through the upper frame 25 in a state where the lateral sections thereof are the same. An axial hole 24b1 for pivotally supporting the right lower-arm 17b of the cushion frame 11 is provided in the lower end portion of the right side-frame 24b.

As illustrated in FIGS. 1 to 3, the center frame 26 is a member formed in such a manner that a work material with a closed section obtained by extrusion-molding a metal material (aluminum in this embodiment) is subject to a process such as bending and drilling. A first center frame 26a provided between the left side-frame 24a and the central side-frame 24c and a second center frame 26b provided between the right side-frame 24b and the central side-frame 24c are included in the center frame 26. Both of them are provided with a plurality of irregular holes which have a function as a reduction hole, and are subject to a bending process to have a convex shape to a rear side.

The left end of the first center frame 26a abuts on the right surface 24a14 of the left side-frame 24a, and the right end abuts on the left surface 24c13 of the central side-frame 24c, each of which are connected by welding. The right end of the second center frame 26b abuts on the left surface of the right side-frame 24b, and the left end abuts on the right surface 24c14 of the central side-frame 24c, each of which are connected by welding.

As illustrated in FIGS. 1 to 4, the retractor bracket 27 is an aluminum press component. The retractor bracket 27 has a substantially square shape in front view, and has a bent shape convex to the rear side. An upper abutting part 27a formed in a shape corresponding to the lower surface 25d of the upper frame 25 is formed in the upper end of the retractor bracket 27, and a right abutting part 27b formed in a shape corresponding to the left surface 24c13 of the central side-frame 24c is formed in the right end of the retractor bracket 27.

A mounting hole 27c for mounting the retractor 7 is provided in the vicinity of the left lower corner of the retractor bracket 27. A plurality of ribs for securing the surface rigidity are provided in a general portion of the retractor bracket 27. In the retractor bracket 27, in the left lower corner of the connecting part of the central side-frame 24c and the upper frame 25, the upper abutting part 27a abuts on the lower surface 25d of the upper frame 25, and the right abutting part 27b abuts on the left surface 24c13 of the central side-frame 24c, each of which are connected by welding. Herein, the retractor 7 corresponds to "a component" in appended claims.

As illustrated in FIGS. 1 to 4, the retractor 7 is mounted in the retractor bracket 27. The retractor 7 has a winding part 7a of the seat belt 5, and a mounting part 7b of the retractor bracket 27. The winding part 7a has a cylindrical shape, and the mounting part 7b is provided with a bolt hole 7c corresponding to the mounting hole 27c of the retractor bracket 27.

When the mounting hole 27c is allowed to match with the bolt hole 7c, and the retractor 7 is fixedly fastened to the retractor bracket 27 by a bolt and a nut, a right upper corner 7d which is a portion of the winding part 7a becomes in the state of being inserted into the hole 24c18 of the left surface 24c13 of the central side-frame 24c. Accordingly, the retractor 7 is disposed in a position which is close to the central side-frame 24c and apart from the seating surface as much as the right upper corner 7d is inserted into the hole 24c18.

The seat belt 5 is fed from the winding part 7a, passes by the guide member 4, and is disposed in a front portion of an upper body of the occupant seating on the central seat CS. Herein, the right upper corner 7d corresponds to "a portion of the component" in the present disclosure.

An assembling method of the rear seat 1 will be described on the basis of FIGS. 1 to 8. First, the lower bracket 24a2 is connected with the lower end portion of the main body part 24a1 of the left side-frame 24a. The front of the front surface 24a11 of the main body part 24a1 is allowed to abut on the rear of the front surface 24a211 of the lower bracket 24a2, and the rivet hole 24a111 of the main body part 24a1 is allowed to match with the rivet hole 24a2111 of the lower bracket 24a2, and is connected by the rivet r. The rear of the rear surface 24a12 of the main body part 24a1 is allowed to abut on the front of the rear surface 24a212 of the lower bracket 24a2, and the rivet hole 24a121 of the main body part 24a1 is allowed to match with the rivet hole 24a2121 of the lower bracket 24a2, and is connected by the rivet r.

Next, the central lower bracket 24c2 is connected with the lower end portion of the central main body part 24c1 of the central side-frame 24c. The main body connecting part 24c21 of the central lower bracket 24c2 is inserted into the lower end portion of the central main body part 24c 1, and is connected by the rivet r.

Next, the upper end of the central side-frame 24c is allowed to abut on a predetermined position of the lower surface 25d of the upper frame 25, and is fixed by welding. In addition, the upper end of the right side-frame 24b is allowed to abut on the right end of the upper frame 25, and is fixed by welding.

Next, the first center frame 26a is fixed by welding in the shape of being stretched between the right surface 24a14 in the almost vertical center of the left side-frame 24a and the left surface 24c13 in the almost vertical center of the central side-frame 24c. The second center frame 26b is fixed by welding in the shape of being bridged between the left surface of the almost vertical center of the right side-frame 24b and the right surface 24c14 of the almost vertical center of the central side-frame 24c. Finally, as described above, the retractor bracket 27 is connected with the left lower corner of the connecting part of the central side-frame 24c and the upper frame 25 by welding, and the guide member 4 is connected with the upper surface 25c of the upper frame 25 by welding. Accordingly, the back frame 21 is obtained.

Thereafter, the lower bracket 24a2 of the back frame 21 is connected with the left lower-arm 17a of the cushion frame 11 through the recliner 2. The central lower bracket 24c2 of the back frame 21 is connected with the central lower-arm 17c of the cushion frame 11 through the recliner 6. The axial hole 24b1 of the right side-frame 24b of the back frame 21 is mounted in the right lower-arm 17b of the cushion frame 11 through a rotational shaft. Accordingly, the back frame 21 is mounted in the cushion frame 11 to be rotatable therearound and to stop the rotation at a desirable tilting angle. Finally, the cushion pad 12 and the back pad 22 are placed thereon, and are covered with the cushion cover 13 and the back cover 23, thereby obtaining the rear seat 1.

The above-configured embodiment has following operational advantages. The retractor 7 is mounted in the retractor bracket 27 provided in the left lower corner of the connecting part of the central side-frame 24c and the upper frame 25. The right upper corner 7d which is a portion of the winding part 7a becomes in the state of being inserted into the hole 24c18 of the left surface 24c13 of the central side-frame 24c. The retractor 7 is disposed in a position which is close to the central side-frame 24c and apart from the seating surface as much as the right upper corner 7d is inserted into the hole 24c 18.

Accordingly, since the retractor 7 is apart from the seating surface, although thickness of a cushion material and the like is not increased, the existence of the retractor 7 is hardly recognized, and the deterioration of the seating comfortableness can be suppressed. The retractor bracket 27 also can be miniaturized as much as the retractor 7 becomes close to the central side-frame 24c, which contributes to weight reduction.

The central side-frame 24c is a tubular member in which the lateral section is a rectangular closed section, and thus the right upper corner 7d of the retractor 7 inserted into the hole 24c18 is disposed inside the inner tube of the central side-frame 24c and does not protrude to the right side from the right surface 24c14. Accordingly, the existence of the retractor 7 has no effect on the central seat CS. In addition, in the central side-frame 24c, the upper portion thereof has a lower bending strength in the front and rear direction and a lower rigidity. Thus, a magnitude of the hole 24c18 can be set to be large, so that the effect as the reduction hole is improved.

Figure 9:
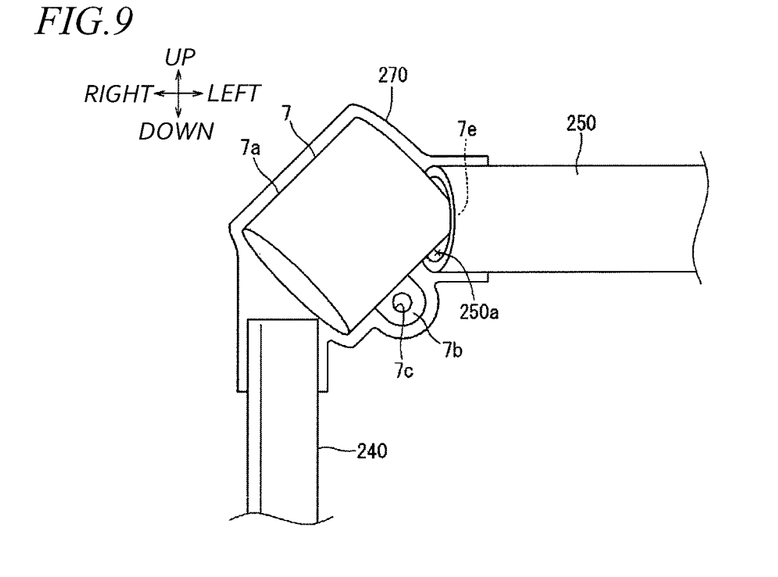
FIG. 9 is a perspective view illustrating a main portion of a seat back frame according to a second embodiment of the present disclosure.

FIG. 9 illustrates a second embodiment of the invention. From the above-described first embodiment, the second embodiment is different in that a retractor bracket 270 also serves as a connection bracket of a side frame 240 and the upper frame 250, and is different in the lateral sectional shape of the upper frame 250. The retractor 7 is the same as above except that the position of the mounting part 7b is slightly different. The side frame 240 is a tubular member in which the lateral section is a rectangular shape or a circular shape, and the upper frame 250 is a tubular member in which the lateral section is a circular shape. The retractor bracket 270 is fixed in the upper end of the side frame 240 and the right end of the upper frame 250 by welding. The retractor 7 becomes in a state where a left lower corner 7e which is a portion of the winding part 7a is inserted into an inner tube 250a of the right end of the upper frame 250 when the retractor 7 is fixed in the retractor bracket 270. The abutting area between the right end of the upper frame 250 and the retractor bracket 270 is easily secured as much as the left lower corner 7e is inserted into the inner tube 250a, and the retractor bracket 270 can be miniaturized.

Accordingly, since the retractor bracket 270 or the retractor 7 is apart from the seating surface, although thickness of a cushion material and the like is not increased, the existence of the retractor 7 is hardly recognized, and the deterioration of the seating comfortableness can be suppressed. In addition, the retractor bracket 270 also can be miniaturized, which contributes to weight reduction. Herein, the side frame 240, the upper frame 250, the retractor bracket 270, the inner tube 250a, and the left lower corner 7e correspond to "a first frame member", "a second frame member", "a component mounting bracket", "a hole", "a portion of the component" in the present disclosure, respectively.

As described with reference to the embodiments, according to a first aspect of the present disclosure, there is provided a vehicle seat including: a first frame member that forms a framework of the vehicle seat and extends in a seat vertical direction or in a seat front-and-rear direction; a second frame member that extends in a seat width direction; and a component mounting bracket that allows to mount a component and is provided in an inside-seat corner portion of a connecting part of the first frame member and the second frame member, wherein the first frame member or the second frame member has a hole into which a portion of the component is inserted when the component is mounted in the component mounting bracket.

According to the first aspect, the component is mounted in the component mounting bracket provided in the inside-seat corner portion of the connecting part of the first frame member and the second frame member, and a portion of the component is disposed into the hole provided in the first frame member or the second frame member. Accordingly, the component is mounted close to the first frame member or the second frame member, and is apart from the seating surface as much as the portion is disposed into the hole. Therefore, although thickness of a cushion material and the like is not increased, the deterioration of the seating comfortableness can be suppressed. In addition, the component mounting bracket also can be miniaturized as much as the component is close to the first frame member or the second frame member. "A component" may be exemplified by a retractor of a seat belt device, a blower device of an air-conditioning seat, a driving motor of a lumber support, and the like. "A hole" may be bottomed, and may be a notch of an end of a member.

According to a second aspect of the present disclosure, at least one of the first frame member and the second frame member may be a tubular member in which a lateral section is a closed section.

According to the second aspect, in the portion of the component disposed into the hole, a portion, of which the component is protrudes to the opposite side of the side where the component is mounted, becomes small as much as the portion of the component is disposed into the first frame member and/or the second frame member. Therefore, the appearance and the like of the first frame member and/or the second frame member on the opposite side of the side where the component is mounted is hardly affected.

According to a third aspect of the present disclosure, the first frame member and the second frame member may be members of a seat back frame, wherein the connecting part may be positioned at an upper portion of the seat back frame, and wherein the hole may be provided in the first frame member.

According to the third aspect, the hole is provided in the first frame member extending in a vertical direction of the seat back frame. In the first frame member of the seat back frame, the upper portion thereof has a lower bending strength in the front and rear direction and a lower rigidity. Thus, the hole also serves as a reduction hole.

According to a fourth aspect of the present disclosure, the component may be a retractor of a seat belt device.

According to the fourth aspect, in a retractor built-in seat of the seat belt device, the retractor can be provided in the seat back while the increase in the thickness of the seat back is suppressed and the seating comfortableness of the occupant is not deteriorated.

According to a fifth aspect of the present disclosure, there is provided a vehicle seat including: a first frame member that forms a framework of the vehicle seat and extends in a seat vertical direction or in a seat front-and-rear direction; a second frame member that extends in a seat width direction; a component mounting bracket that is provided in an inside-seat corner portion of a connecting part of the first frame member and the second frame member; and a component that is mounted to the component mounting bracket, wherein the first frame member or the second frame member has a hole into which a portion of the component is inserted when the component is mounted in the component mounting bracket.

According to the fifth aspect, the component is mounted in the component mounting bracket provided in the inside-seat corner portion of the connecting part of the first frame member and the second frame member, and a portion of the component is disposed into the hole provided in the first frame member or the second frame member. Accordingly, the component is mounted close to the first frame member or the second frame member, and is apart from the seating surface as much as the portion is disposed into the hole. Therefore, although thickness of a cushion material and the like is not increased, the deterioration of the seating comfortableness can be suppressed. In addition, the component mounting bracket also can be miniaturized as much as the component is close to the first frame member or the second frame member. "A component" may be exemplified by a retractor of a seat belt device, a blower device of an air-conditioning seat, a driving motor of a lumber support, and the like. "A hole" may be bottomed, and may be a notch of an end of a member.

While the present invention has been described with reference to specific embodiments heretofore, the present invention is not limited to the appearance and the configuration thereof, and the invention may be modified variously, added, or removed without departing from the spirit and scope of the present invention. For example, following cases may be presented.

In the embodiment, it is described that the retractor bracket 27 is arranged between the central side-frame 24c of the back frame 21 and the upper frame 25. However, the present invention is not limited thereto, and may be applied for providing a retractor bracket arranged between a side frame and an upper frame of a front seat for one person. In addition, the present invention may be applied for providing a retractor bracket arranged between a side frame and a front frame of a cushion frame, a retractor bracket arranged between a side frame and a rear frame thereof, and the like.

In the embodiment, the seat of the automobile is described. However, the present invention may be applied to a seat mounted in an airplane, a ship, a train, and the like.

What is claimed is:

1. A vehicle seat comprising:
a first frame member that extends in at least one of a seat vertical direction or in a seat front-and-rear direction;
a second frame member that extends in a seat width direction; and
a component mounting bracket that is attached to an inside-seat corner portion of a connecting part of the first frame member and the second frame member such that the component mounting bracket is spaced rearward of front surfaces of the first frame member and the second frame member in the seat front-and-rear direction, the component mounting bracket being configured to allow a component to be mounted to the component mounting bracket,
wherein at least one of the first frame member or the second frame member has a hole into which a portion of the component is inserted when the component is mounted to the component mounting bracket.

2. The vehicle seat according to claim 1,
wherein at least one of the first frame member and the second frame member is a tubular member in which a lateral section is a closed section.

3. The vehicle seat according to claim 1,
wherein the first frame member and the second frame member are members of a seat back frame,
wherein the connecting part is positioned at an upper portion of the seat back frame, and
wherein the hole is provided in the first frame member.

4. The vehicle seat according to claim 3,
wherein the component is a retractor of a seat belt device.

5. The vehicle seat according to claim 1,
wherein the hole is defined in a side surface of the first frame member.

6. The vehicle seat according to claim 1,
wherein the hole is opened in an inner seat direction such that when the component is mounted to the component mounting bracket, the portion of the component is inserted into the hole in the seat width direction.

7. The vehicle seat according to claim 3,
wherein the component mounting bracket includes:
a first abutting part defined in a side end of the component mounting bracket that is formed in a shape corresponding to a side surface of the first frame member; and a second abutting part defined in an upper end of the component mounting bracket that is formed in a shape corresponding to a lower surface of the second frame member.

8. The vehicle seat according to claim 4, wherein the portion of the component inserted in the hole, when the component is mounted in the component mounting bracket, is a corner portion of the component.

9. A vehicle seat comprising:
a first frame member that extends in at least one of a seat vertical direction or in a seat front-and-rear direction;
a second frame member that extends in a seat width direction;
a component mounting bracket that is attached to an inside-seat corner portion of a connecting part of the first frame member and the second frame member such that the component mounting bracket is spaced rearward of front surfaces of the first frame member and the second frame member in the seat front-and-rear direction; and
a component that is mounted to the component mounting bracket,
wherein at least one of the first frame member or the second frame member has a hole into which a portion of the component is inserted when the component is mounted in the component mounting bracket.

\* \* \* \* \*